United States Patent [19]
Szabo et al.

[11] 3,826,311
[45] July 30, 1974

[54] PRODUCING WELL TREATMENT

[75] Inventors: Miklos Tamas Szabo, Coraopolis; Andrew Jackson Sharpe, Jr., McMurray; Nancy Spicer Sherwood, Sewickley, all of Pa.

[73] Assignee: Calgon Corporation, Pittsburgh, Pa.

[22] Filed: June 13, 1973

[21] Appl. No.: 369,630

[52] U.S. Cl............. 166/295, 166/292, 166/294, 166/305 R
[51] Int. Cl............... E21b 33/13, E21b 43/16
[58] Field of Search............ 166/275, 292–295, 166/305 R

[56] References Cited
UNITED STATES PATENTS

| | | | |
|---|---|---|---|
| 2,331,594 | 10/1943 | Blair | 166/305 R |
| 2,776,714 | 1/1957 | Draper et al. | 166/305 R |
| 3,087,543 | 4/1963 | Arenot | 166/295 |
| 3,247,900 | 4/1966 | Perry et al. | 166/295 |
| 3,308,885 | 3/1967 | Sandiford | 166/305 R |
| 3,448,800 | 6/1969 | Parker et al. | 166/294 |
| 3,679,000 | 7/1972 | Kaufman | 166/275 |

*Primary Examiner*—Frank L. Abbott
*Assistant Examiner*—Jack E. Ebel
*Attorney, Agent, or Firm*—Rudolph J. Anderson, Jr.; Harry E. Westlake; Martin L. Katz

[57] ABSTRACT

Use of copolymers of (3-acrylamido-3-methyl) butyl trimethyl ammonium chloride and acrylamide to treat producing wells in order to reduce water production and improve the oil-water ratio of said well or gas-water.

7 Claims, No Drawings

PRODUCING WELL TREATMENT

BACKGROUND OF THE INVENTION

This invention relates to a process for preferentially reducing or eliminating water production from an oil or gas-producing sub-surface formation.

In producing oil from both natural and artificial water drive oil reservoirs, the wells ultimately produce sufficiently large volumes of salt water to constitute a serious operating problem and eventually production of the salt water forces abandonment of the well. The cost of raising the brine to the earth's surface and of separating it from the oil represents an economic loss and, in addition, in many instances, there is a problem in disposal of the waste water. Even more importantly, the total volume of fluid that can be produced daily is often limited by the well bore and artificial lift equipment so that unnecessary water production unnecessarily reduces the oil production rate. In many instances, a portion of the reservoir is producing essentially all salt water, while the remainder of the section is producing a substantial quantity of oil. If production from the watered-out portion of the reservoir is eliminated or reduced, the production, handling and disposal of large volumes of water is avoided. This results in major savings in operating costs, the avoidance of unnecessary depletion of the water drive, and increased production from the remaining oil interval which results in greater ultimate recovery and greater current income.

Attempts have been made to reduce production of water by plugging off the lower water section of the production interval with cement, plastic, or other similar materials or by cementing off the entire production interval and selectively reperforating in the oil-producing portion. However, these procedures have disadvantages. In the first place, they are expensive and secondly, it is often difficult or impossible to predict which part of the producing interval is producing water and which is still producing oil. Many times the wrong interval is retained and in some instances, the entire producing interval is essentially at the same degree of depletion. Recently, an oil slurry cement has been employed in the supposition that by avoiding water in the slurry, the cement would depend upon formation water to set up and would consequently cement off the water producing zone. Little success has been obtained, however, with this latter procedure because of its inherent weaknesses and operational problems.

The present invention provides a solution to the problem of water production by preferentially decreasing the flow rate of water into the well bore without decreasing the flow of oil, thereby resulting in increased net daily oil production. The method of this invention comprises injecting into the formation, through a producing well, a substantial quantity of an aqueous solution of a copolymer of (3-acrylamido-3-methyl) butyl trimethyl ammonium chloride (AMBTAC) and acrylamide (AM). The molar ratio of AMBTAC to AM may be from about 1 percent AMBTAC and about 99 percent AM to about 60 percent AMBTAC and about 40 percent AM, however, the preferred molar ratio is between about 15 to about 35 percent AMBTAC and about 85 to about 65 percent AM, while from 0 to 50 percent of the amide groups may be hydrolyzed to carboxylic acid groups. It is generally preferred that the polymer treating agents of this invention be high molecular weight polymers, having a molecular weight of at least about 100,000. Furthermore, the copolymers used in accordance with the teaching of this invention may, if desired, be cross-linked.

U.S. Pat. Nos. 3,087,543 to Arendt and 3,308,885 to Sandiford describe treating processes which are essentially the same as the present process. However, neither of these patents discloses the (3-acrylamido-3-methyl) butyl trimethyl ammonium chloride/acrylamide copolymers claimed herein.

The concentration of AMBTAC/AM treating agent in the aqueous solution pumped down the well may vary over a wide range, from about 1 ppm to about 5 percent by weight. The optimum concentration will depend, to a large extent, upon the volume of reservoir water with which the treating solution will be diluted in the formation. It is preferred to adjust the concentration of treating agent, and the volume of the aqueous slug injected, so that the concentration of treating agent in the formation waters will be between about 0.01 percent and 0.5 percent by weight. It is further preferred that the volume of the aqueous slug injected be between about 0.02 percent and 5 percent of the oil volume in the oil recovery area around the given producing well being treated.

In carrying out the process of this invention, conventional injection procedures are employed, i.e., the well to be treated is suitably fitted with packers, if required, and the aqueous treating agent is forced down the well bore and out into the reservoir formation by means of conventional pumping equipment (if required) located at the well head. Normally, the injection can be completed in about ½ to 3 days, after which the well may be substantially immediately placed back on production. The initial well effluent following the treatment is sharply reduced in water/oil ratio, and production may be continued for several weeks or months with improved oil recovery and reduced water production. Gradually, however, the water/oil ratio will begin to rise again, and when the ratio reaches an undesirably high level, the well may be again shut in and the treatment repeated to again improve production.

The process of this invention is designed for treating substantially any type of producing well, either an oil well or a gas well. Such well may be operating under natural flow conditions, or it may be a producing well involved in a secondary recovery operation wherein a flooding medium, or gaseous driving medium is being injected into an adjacent well. It is contemplated that in such secondary recovery operations, treatment of the producing well will cause the selective diversion of reservoir waters to other wells, or to adjacent aquafer structures, thus reducing the water/oil ratio in the producing well effluent.

The following examples are cited to illustrate the invention, and to demonstrate the beneficial results obtained therefrom but are not to be construed as limiting in scope.

EXAMPLE 1

This example shows that if a porous media is treated with an aqueous solution of an AMBTAC/AM copolymer, the permeability of the porous media to brine is considerably decreased. In a comparative test, it is shown that the AM/AMBTAC treatment was more efficient than the treatment applying an acrylamide product for producing well treatment.

The porous material is a 700 md permeability silica sand. The sand is packed into a Plexiglas sandholder under brine. The sandpack has a 6 cm length and the cross-sectional area is 28.5 cm². First, a 2 percent NaCl brine solution is injected through the sand, applying a constant flow rate. The injection pressure is read after it is stabilized. Thereafter, a 500 mg/l (concentration) polymer solution dissolved in 2 percent NaCl brine, is injected through the sandpack. The same flow rate is applied as during brine injection. The injection pressure is continuously monitored. The polymer flow resistance factor ($R_p$) is expressed as the ratio of the injection pressure during polymer flow and brine flow. Having attained 5 pore volumes of injected polymer solution, the injection of polymer solution is stopped. In the next step, brine is injected through the sandpack using the previously applied flow rate. The injection pressure is again monitored. The brine flushed resistance factor ($R_{BF}$) is expressed as the pressure ratio during brine flush and during the first brine flow.

In Table 1 the resistance factors obtained at 5 pore volumes of injected fluids are listed.

TABLE 1

| Polymer | $R_p$ | $R_{BF}$ |
| --- | --- | --- |
| 70/30 AM/AMBTAC (mole ratio) | 7.229 | 3.739 |
| Acrylamide, 18 percent hydrolyzed | 5.023 | 2.031 |

EXAMPLE 2

The experiments below demonstrate the effectiveness of an AM/AMBTAC copolymer in oil-producing well treatment. These experiments show that after the treatment of a porous material, such as millipore filter paper, with an aqueous solution of an AM/AMBTAC copolymer, the permeability to the aqueous phase will be considerably lower, but the permeability to a hydrocarbon phase is unchanged or only slightly decreased.

First, 100 ml brine (2 percent NaCl) is pumped through a certain size of millipore filter at a constant 15 psi pressure. The time required to inject through this volume of brine is measured. Thereafter, 100 ml kerosene is injected through the same filter paper measuring the elapsed time. After the kerosene flow, a few milliliters of a 1,000 mg/l AM/AMBTAC solution (dissolved in 2 percent NaCl brine) is injected. Following the polymer treatment, 100 ml of kerosene is pumped again through the same filter. The elapsed time is measured. In the last step, brine is injected measuring the time required to collect a 100 ml volume. During each subsequent test a 15 psi pressure is applied.

TABLE 2

1,000 ppm 70/30 AM/AMBTAC Polymer in 2 Percent NaCl Brine, 3μ Millipore Filter Disc

| Fluid | Volume ml | Time Sec. | Time Ratio (After and Before Polymer Treatment) |
| --- | --- | --- | --- |
| Brine | 100 | 1.9 | — |
| Kerosene | 100 | 3.75 | — |
| Polymer | 4 | 99.6 | — |
| Kerosene | 100 | 17.7 | 4.72 |
| Brine | 100 | 3151.0 | 1658.4 |

TABLE 3

1,000 ppm 70/30 AM/AMBTAC Polymer in 2 Percent NaCl Brine, 5μ Millipore Filter Disc

| Fluid | Volume ml | Time Sec. | Time Ratio (After and Before Polymer Treatment) |
| --- | --- | --- | --- |
| Brine | 100 | 1.2 | — |
| Kerosene | 100 | 2.1 | — |
| Polymer | 6 | 47.0 | — |
| Kerosene | 100 | 5.0 | 2.38 |
| Brine | 100 | 436.9 | 364.08 |

TABLE 4

1,000 ppm 70/30 AM/AMBTAC Polymer in 2 Percent NaCl Brine, 5μ Millipore Filter Disc

| Fluid | Volume ml | Time Sec. | Time Ratio (After and Before Polymer Treatment) |
| --- | --- | --- | --- |
| Brine | 100 | 1.5 | — |
| Kerosene | 100 | 2.2 | — |
| Polymer | 2 | 13.2 | — |
| Kerosene | 100 | 4.0 | 1.82 |
| Brine | 100 | 304.4 | 202.93 |

TABLE 5

1,000 ppm 80/20 AM/AMBTAC Polymer in 2 Percent NaCl Brine, 5μ Millipore Filter Disc

| Fluid | Volume ml | Time Sec. | Time Ratio (After and Before Polymer Treatment) |
| --- | --- | --- | --- |
| Brine | 100 | 1.5 | — |
| Kerosene | 100 | 2.2 | — |
| Polymer | 2 | 62.0 | — |
| Kerosene | 100 | 2.2 | 1.00 |
| Brine | 100 | 18.4 | 12.27 |

As can be seen from the results set forth in Tables 2, 3, 4, and 5, AM/AMBTAC polymer treatment resulted in 351.3, 153.0, 111.5 and 12.27 times greater reduction in brine flow rates compared to the reduction in kerosene flow rates.

We claim:

1. A method of recovering a member selected from the group of oil and gas from a subterranean formation which is penetrated by a well bore, and for reducing the concomitant production of reservoir water therefrom comprising injecting into said formation through said well bore an aqueous treating solution containing a copolymer of (3-acrylamido-3-methyl) butyl trimethyl ammonium chloride and acrylamide, then terminating the injection of said treating solution and thereafter placing the treated well in production.

2. A method as in claim 1 wherein said member is oil.

3. A method as in claim 1 wherein said member is gas.

4. A method as in claim 1 wherein said copolymer contains from about 1 to 60 mole percent (3-acrylamido-3-methyl) butyl trimethyl ammonium chloride and from about 40 to 99 mole percent acrylamide.

5. A method as in claim 4 wherein the copolymer contains from about 15 to 35 mole percent (3-acrylamido-3-methyl) butyl trimethyl ammonium chloride and from about 65 to 85 mole percent acrylamide.

6. A method as in claim 1 wherein from about 0 to 50 percent of the amide groups are hydrolyzed to carboxyl groups.

7. A method as in claim 1 wherein the copolymer has a molecular weight of at least 100,000.

* * * * *